(12) United States Patent
Sayir

(10) Patent No.: US 11,503,960 B2
(45) Date of Patent: Nov. 22, 2022

(54) DISHWASHER COMPRISING A FRUIT AND VEGETABLE WASHING APPARATUS

(71) Applicant: Vestel Beyaz Esya Sanayi ve Ticaret Anonim Sirketi, Manisa (TR)

(72) Inventor: Halil Sayir, Manisa (TR)

(73) Assignee: Vestel Beyaz Esya Sanayi ve Ticaret Anonim Sirketi, Manisa (TR)

( * ) Notice: Subject to any disclaimer, the term of this patent is extended or adjusted under 35 U.S.C. 154(b) by 204 days.

(21) Appl. No.: 17/083,134

(22) Filed: Oct. 28, 2020

(65) Prior Publication Data

US 2021/0330130 A1 Oct. 28, 2021

(30) Foreign Application Priority Data

Aug. 28, 2019 (TR) .................................. 2019/13012

(51) Int. Cl.
| | |
|---|---|
| *A47J 43/24* | (2006.01) |
| *A47L 15/00* | (2006.01) |
| *A47L 15/42* | (2006.01) |
| *A47L 15/50* | (2006.01) |
| *B01D 29/01* | (2006.01) |

(Continued)

(52) U.S. Cl.
CPC ............ *A47J 43/24* (2013.01); *A47L 15/0097* (2013.01); *A47L 15/4221* (2013.01); *A47L 15/4225* (2013.01); *A47L 15/505* (2013.01); *B01D 29/01* (2013.01); *B01D 29/11* (2013.01); *B01D 29/50* (2013.01); *A47L 2301/04* (2013.01); *A47L 2501/03* (2013.01)

(58) Field of Classification Search
None
See application file for complete search history.

(56) References Cited

U.S. PATENT DOCUMENTS

| 7,905,962 B1* | 3/2011 | Di Panni ................. | A47J 43/24 |
| | | | 134/25.1 |
| 2009/0266383 A1* | 10/2009 | Wang ..................... | A47J 43/24 |
| | | | 134/109 |

FOREIGN PATENT DOCUMENTS

| CN | 108552792 A | 9/2018 |
| KR | 20080033366 A | 4/2008 |

* cited by examiner

*Primary Examiner* — Rita P Adhlakha
(74) *Attorney, Agent, or Firm* — Dennemeyer & Associates; Steven M. Shape

(57) ABSTRACT

The present invention relates to a dishwasher for washing fruits and vegetables with less water and minimum energy use. The dishwasher (M) comprises main body; first basket (S); bottom area (1) in which there are provided two-way valve (1a), first channel (1b) and second channel (1c); washing compartment (2) comprising third channel (2a), first water outlet (2b), second water outlet (2c) and drainage connection unit (2d); fruit and vegetable washing apparatus (F) located on the first basket (S) and comprising chamber (4) in which fruits and vegetables are washed, carrying member (2) providing connection to the first basket (S) and one side of which is connected with lower side of the chamber (4), first water inlet (7) through which water reaching the first water outlet (2b) is transmitted into the carrying member (2), second water inlet (8) transmitting water from the second water outlet (2c) into the chamber (4); and control unit which controls operation of the valve (1a) such that water is transmitted to the second channel (1c) for washing fruits and vegetables or to the first channel (1b) for washing dishes inside the dishwasher (M), in response to the user-selected washing program of the dishwasher (M).

14 Claims, 12 Drawing Sheets

(51) Int. Cl.
*B01D 29/11* (2006.01)
*B01D 29/50* (2006.01)

DISHWASHER COMPRISING A FRUIT AND VEGETABLE WASHING APPARATUS

CROSS-REFERENCE TO RELATED APPLICATIONS

This application claims priority to Turkish application 2019/13012, filed Aug. 28, 2019, which is hereby incorporated by reference in its entirety.

TECHNICAL FIELD

The present invention relates to a dishwasher which comprises a fruit and vegetable washing apparatus, so that the vegetables and fruits are washed with less water and minimum energy use.

BACKGROUND OF THE INVENTION

Currently, fruits and vegetables are washed by the users either when they are desired to be used, or they are grouped and washed at once and stored in a household appliance. Washing process can be repeated several times by the user in order to clean fruits and vegetables completely. This causes considerable amount of water to be consumed during the washing processes. In addition, washing process for fruits and vegetables requires a lot of time. Therefore, users generally prefer to wash fruits and vegetables when they need to use them.

Various applications for solving said problems are included by the known art, wherein one of these applications is explained in the published patent document no. KR20080033366A. Application in said patent document discloses a device for washing fruits and vegetables. Said device comprises a washing cage; at least one spray element for spraying water into the washing cage; a rotation mechanism for rotating the washing cage; and at least one water pump. However, the device requires an energy source to operate. This causes additional energy consumption. Another application is disclosed in the published patent document no. CN108552792A. Application in said patent document discloses a dishwasher comprising a fruit and vegetable washing compartment. The dishwasher allows washing both fruits and vegetables, and dirty kitchen utensils with a single energy source. However, during the washing process, dirty water from vegetables and fruits may come into contact with the washed kitchen utensils. Similarly, washing water of the dishwasher containing chemicals may contact fruits and vegetables. This can cause both kitchen equipment to be damaged and vegetables and fruits to be exposed to chemicals, thus causing the health of the users to deteriorate.

BRIEF DESCRIPTION OF THE INVENTION

The present invention relates to a dishwasher for washing vegetables and fruits with less water and minimum energy use. The dishwasher comprises a main body; at least a first basket which is located in the main body and receives the dishes to be washed, the dishwasher characterized by comprising:
at least one bottom area in which there are located at least one valve which is at least two-way and is connected with a water source; at least a first channel connected with the valve on one side, wherein water reaching the valve from the source is passed through the first channel to clean the dishes in the first basket; and at least a second channel connected with the valve on one side;
at least one washing compartment having the first basket therein, located in the main body and comprising at least a third channel connected with the second channel on one side; at least a first water outlet to which the water reaching the third channel by passing through the second channel reaches, wherein one side of the first water outlet is connected with the third channel so as to have an angle other than 0 and 180 degrees in between; at least a second water outlet which is connected with the second channel on at least one side and to which the water passing through the second channel reaches; and at least one drainage connection unit;
at least one fruit and vegetable washing compartment which is located above the first basket and comprises:
at least one chamber in which fruits and vegetables are washed,
at least one carrying member providing connection to the first basket, wherein one side of the carrying member is connected with lower side of the chamber,
at least a first water inlet connected with the first water outlet, wherein the water reaching the first water outlet by passing through second channel and third channel is transmitted through the first water inlet into the carrying member;
at least a second water inlet which is connected with the second water outlet and transmits the water coming from the second water outlet by passing through the second channel to the chamber; and
at least one control unit which contains the information to which channel the water reaching the valve will be directed in response to at least one washing program of the dishwasher that can be selected by a user through at least one control element, and controls operation of the valve such that the water reaching the valve from the source is transmitted to the second channel for washing fruits and vegetables or to the first channel for washing dishes inside the dishwasher, in response to the user-selected washing program.

Thanks to the dishwasher (M) comprising a fruit and vegetable washing apparatus (F), fruits and vegetables can be washed with less water and energy consumption. Moreover, with the present invention, the water received into the fruit and vegetable washing apparatus (F) and the dishwasher (M) do not mix with each other during washing process. This prevents residues (such as oil, detergent) that may have remained in the dishwasher (M) from penetrating into the washed fruits and/or vegetables.

OBJECT OF THE INVENTION

An object of the present invention is to provide a dishwasher which comprises a fruit and vegetable washing apparatus and enables vegetables and fruits to be washed with less water and energy consumption.

Another object of the present invention is to provide a dishwasher which comprises a fruit and vegetable washing apparatus and in which fruits and vegetables are prevented from being exposed to washing water inside the dishwasher.

A further object of the present invention is to provide a dishwasher which comprises a fruit and vegetable washing apparatus and in which dishes in the dishwasher are prevented from being exposed to washing water inside the fruit and vegetable washing apparatus.

Yet a further object of the present invention is to provide a dishwasher which saves time, water and energy thanks to the fruit and vegetable washing apparatus it comprises.

DESCRIPTION OF THE DRAWINGS

Exemplary embodiments of the dishwasher according to the present invention are illustrated in the attached drawings, in which.

Figure 1:
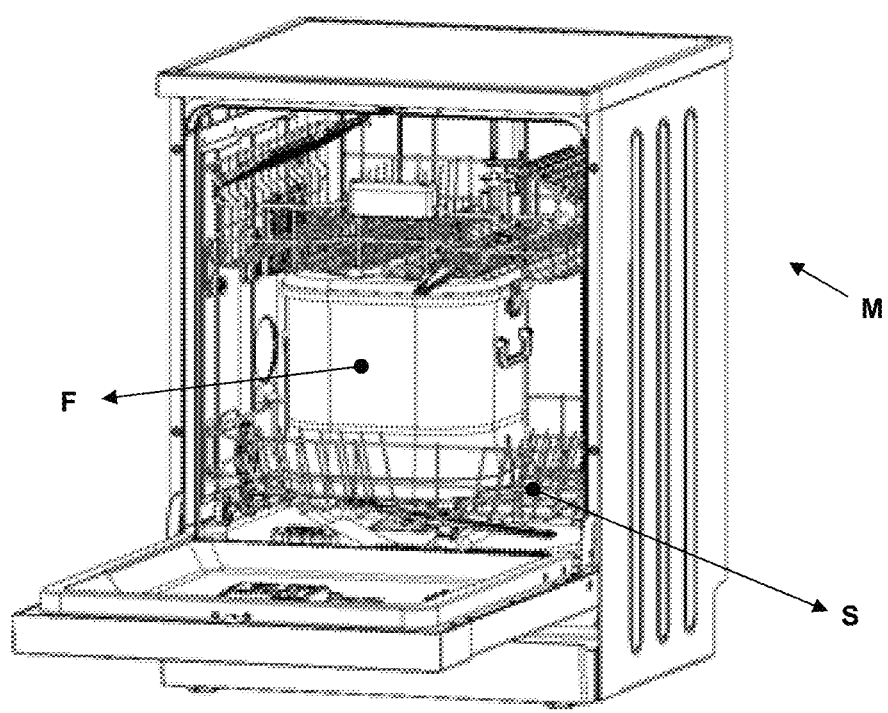
FIG. 1 is a perspective view of a dishwasher in which the fruit and vegetable washing apparatus according to the invention is provided.

All the parts illustrated in figures are individually assigned a reference numeral and the corresponding terms of these numbers are listed below:
Dishwasher (M)
First basket (S)
Bottom area (1)
Valve (1a)
First channel (1b)
Second channel (1c)
Washing compartment (2)
Third channel (2a)
First water outlet (2b)
Second water outlet (2c)
Drainage connection unit (2d)
Fruit and vegetable washing apparatus (F)
Cover (3)
Chamber (4)
Second basket (5)
First handle (5a)
Carrying member (6)
Nozzle (6a)
Holding member (6b)
Collection reservoir (6c)
First filter (6d)
Second filter (6e)
Fourth channel (6f)
Pumping section (6g)
Pump chamber (6h)
Watermill (6i)
First gear wheel (6j)
Second gear wheel (6k)
Fin (6m)
Fifth channel (6n)
First water inlet (7)
Second water inlet (8)
Drainage (9)
Drainage pipe (9a)
Connection area (10)
Second handle (11)
Locking mechanism (12)

DESCRIPTION OF THE INVENTION

Users either wash fruits and vegetables in a required amount when they desire to use them, or group them and wash at a time to store fruits and vegetables in a household appliance for later use. In order to clean fruits and vegetables, especially leafy vegetables properly, washing process can be repeated several times. This causes considerable amount of water and time to be consumed during the washing processes. Currently, there are various devices/apparatuses for washing fruits and vegetables. Such devices generally decrease water consumption. However, these devices need an energy source for operating, which increases energy consumption. Furthermore, there are fruit and vegetable washing apparatuses operating in communication with dishwashers in order to decrease both water and energy use. However, the detergent liquid in the dishwasher can contaminate fruits and vegetables while using the fruit and vegetable washing apparatus. This can cause the health of the users to deteriorate. Within this context, the present invention provides a dishwasher which comprises a fruit and vegetable washing apparatus for solving said problems.

Figure 2:
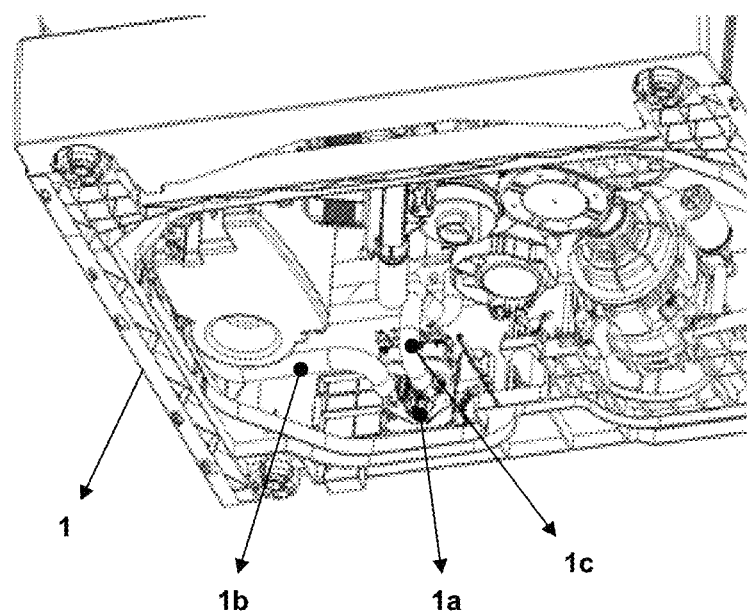
FIG. 2 is a perspective view of a bottom area of the dishwasher according to the invention.
Figure 3:
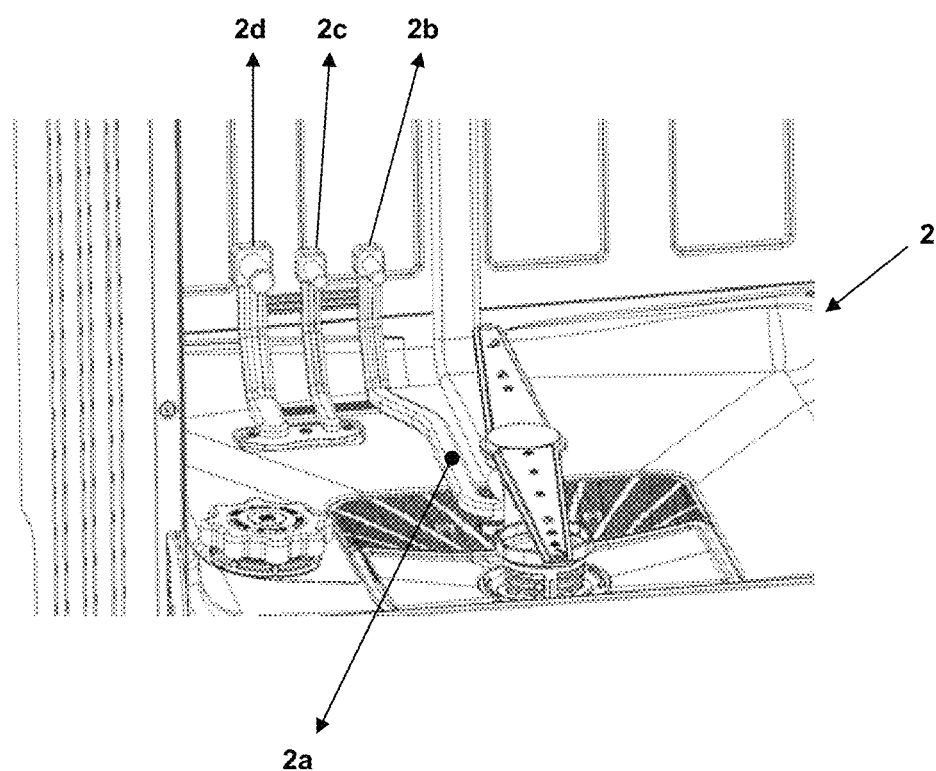
FIG. 3 is a detailed perspective view of a washing compartment of the dishwasher according to the invention.
Figure 4:
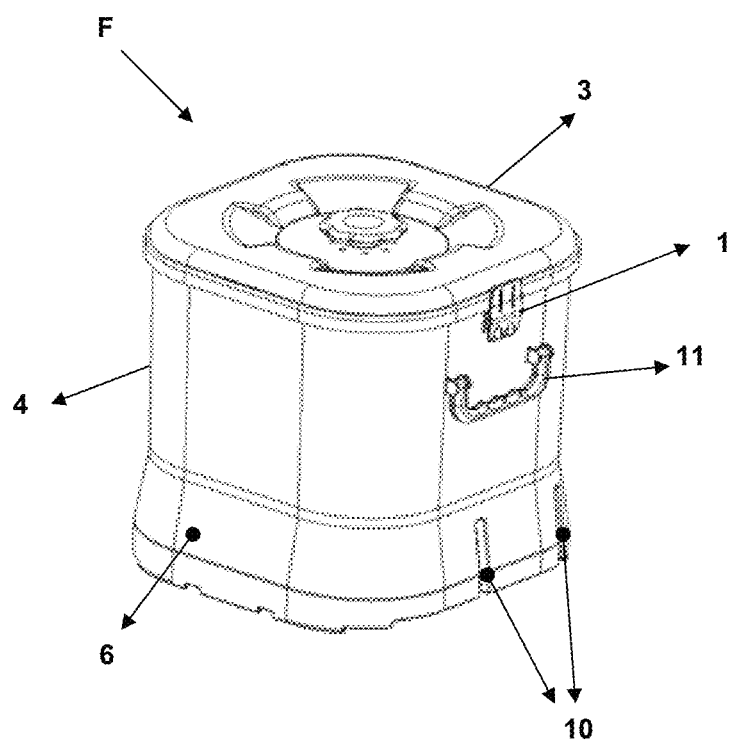
FIG. 4 is a perspective view of the fruit and vegetable washing apparatus of the dishwasher according to the invention.
Figure 5:
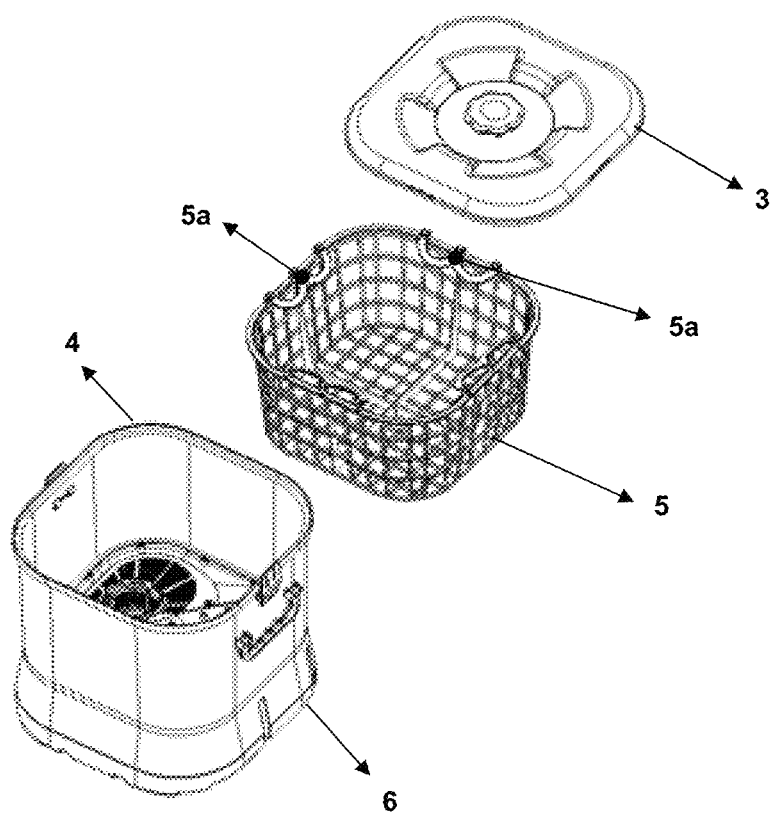
FIG. 5 is a view of cover, chamber and second basket of the fruit and vegetable washing apparatus in a disassembled state.
Figure 6:
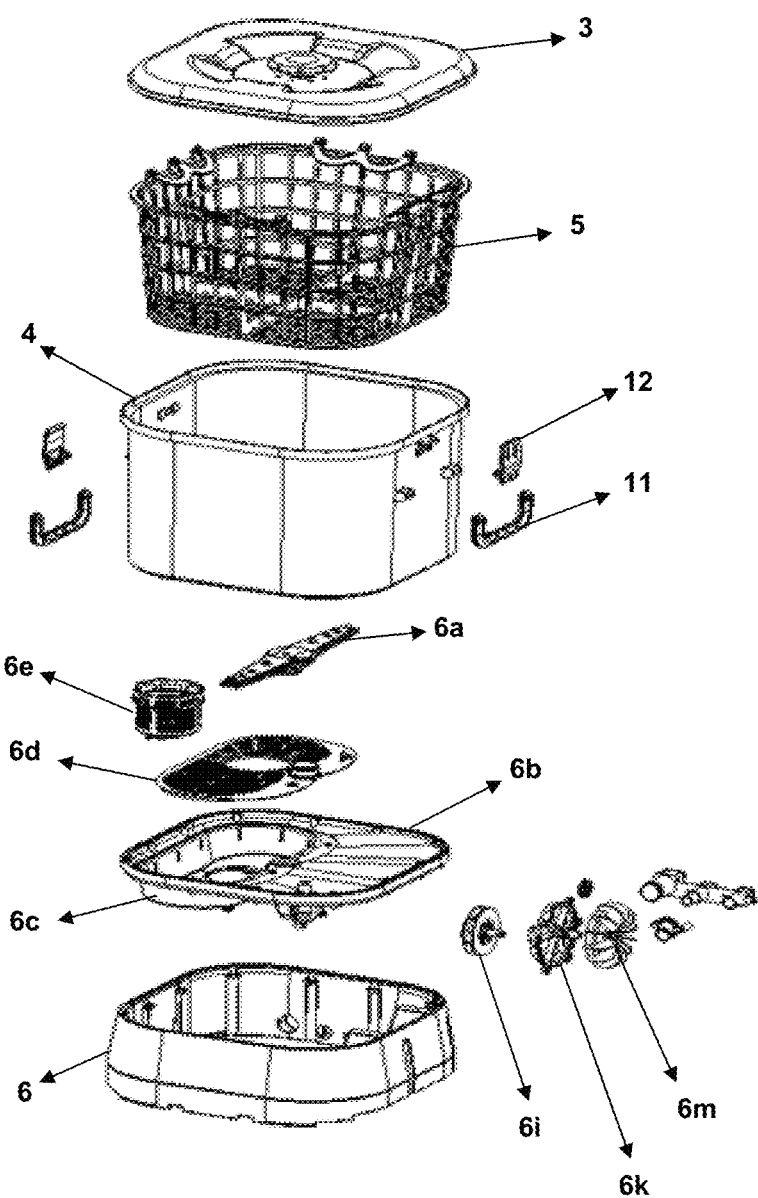
FIG. 6 is an exploded view of the fruit and vegetable washing apparatus.
Figure 7:
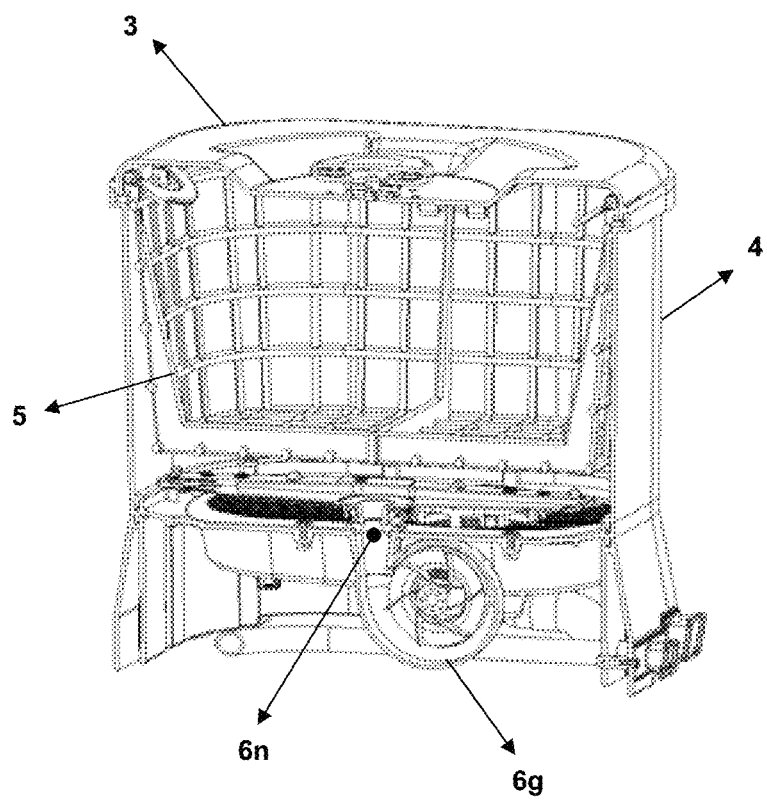
FIG. 7 is a side sectional perspective view of the fruit and vegetable washing apparatus.
Figure 8:
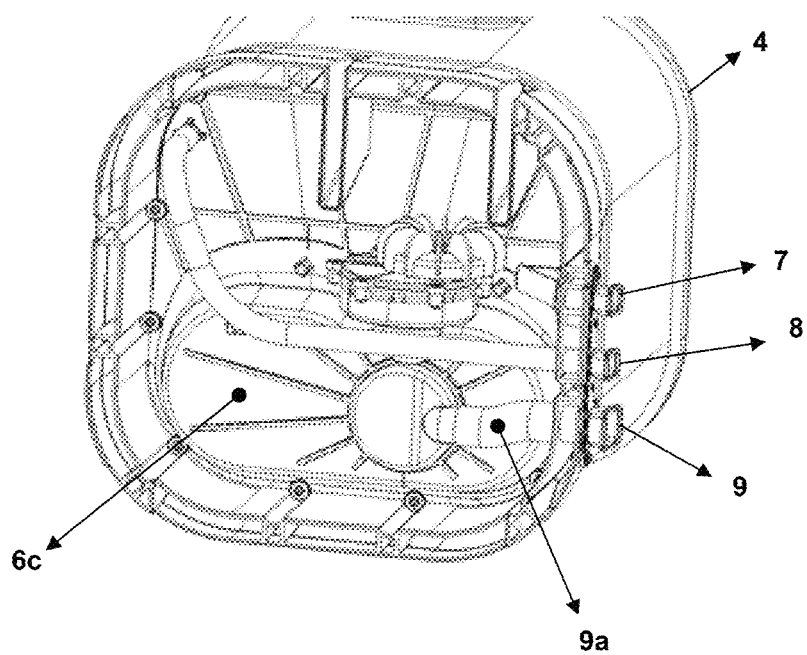
FIG. 8 is a bottom perspective view of the fruit and vegetable washing apparatus.
Figure 9:
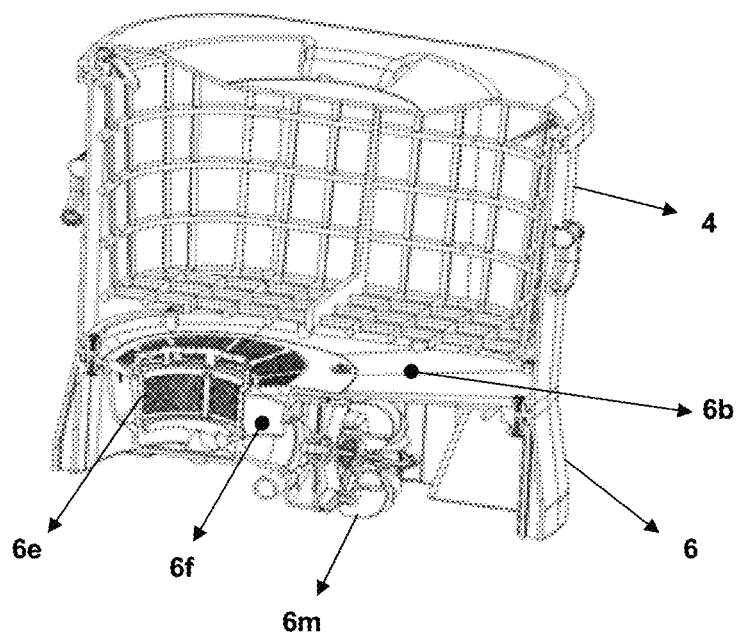
FIG. 9 is another side sectional perspective view of the fruit and vegetable washing apparatus.
Figure 10:
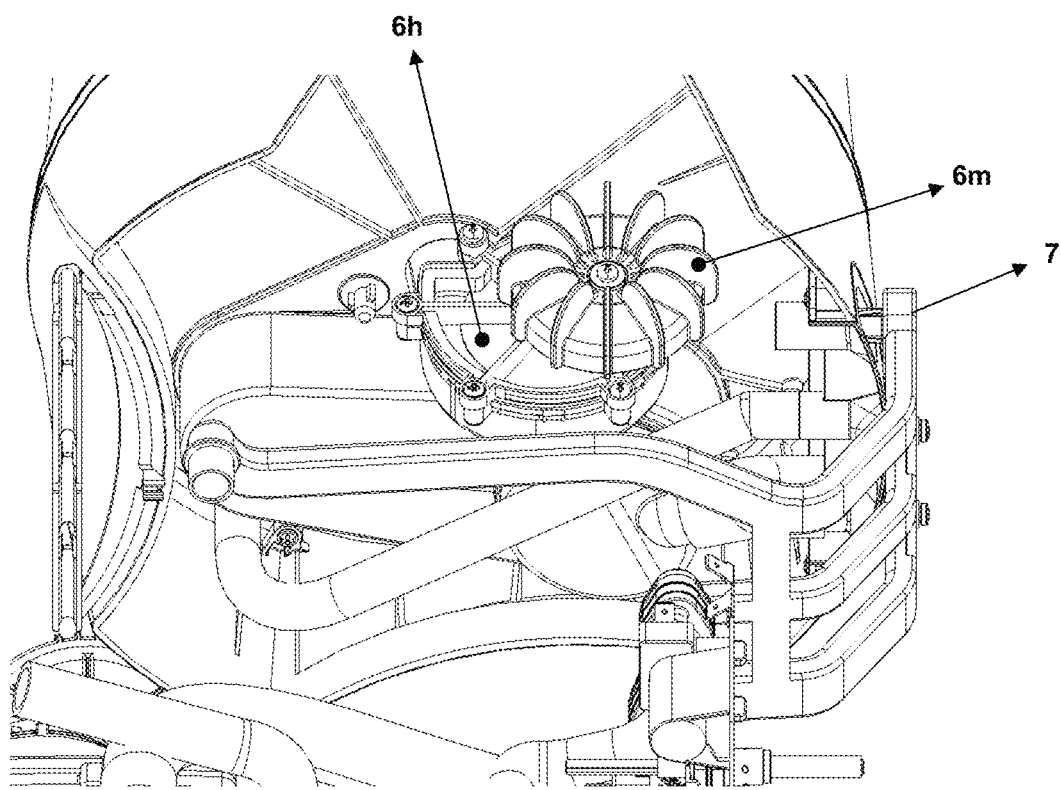
FIG. 10 is a bottom detailed view of a carrying member of the fruit and vegetable washing apparatus.
Figure 11:
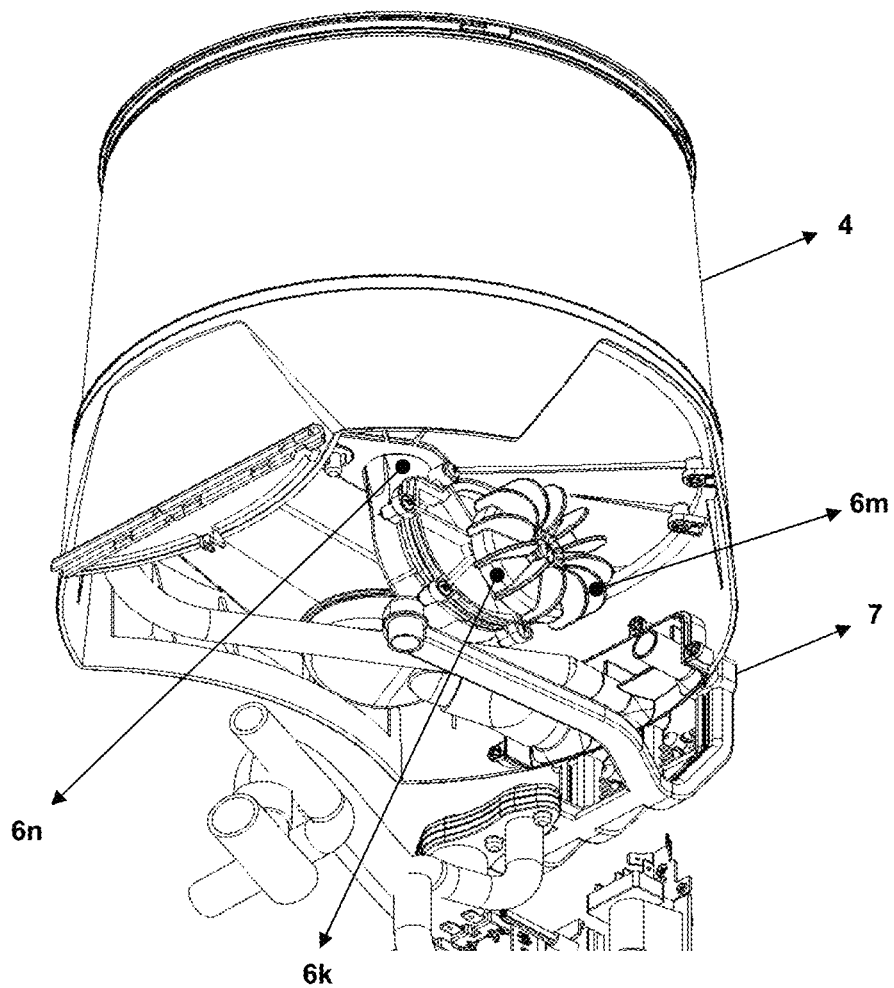
FIG. 11 is a bottom perspective view of the fruit and vegetable washing apparatus.
Figure 12:
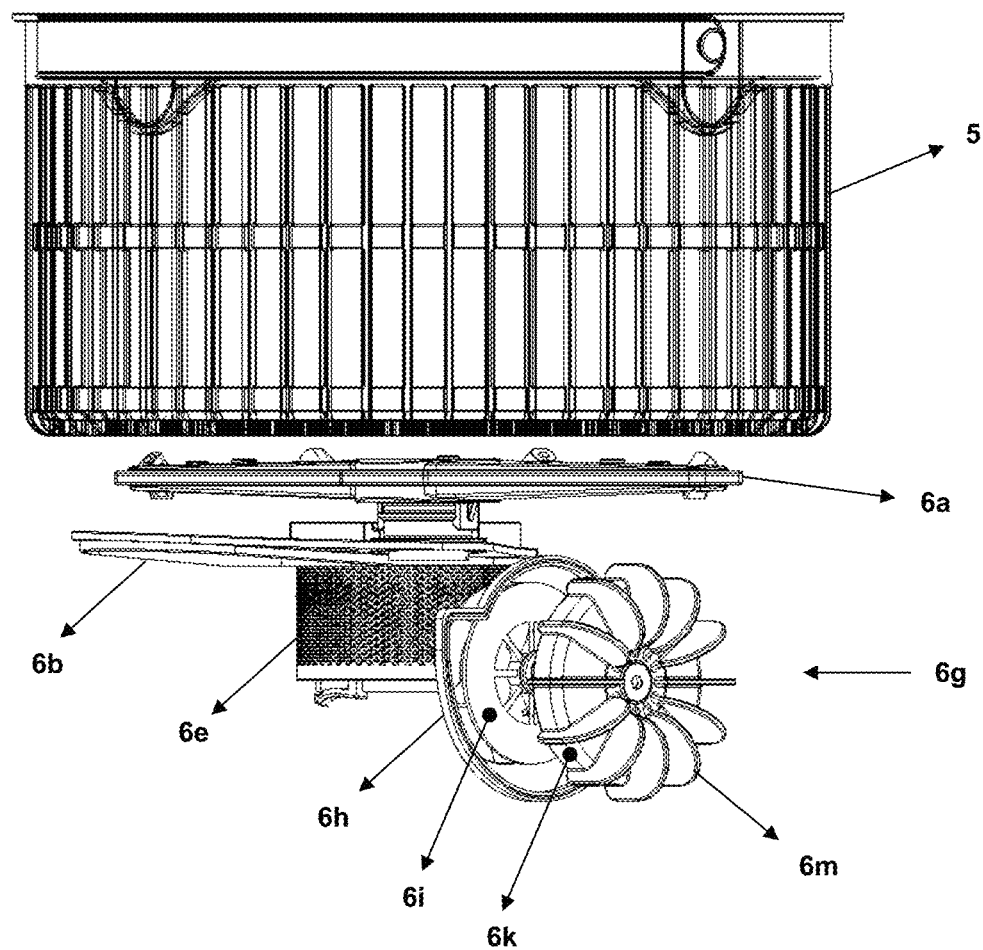
FIG. 12 is a detailed perspective view of an inner part of the fruit and vegetable washing apparatus.
Figure 13:
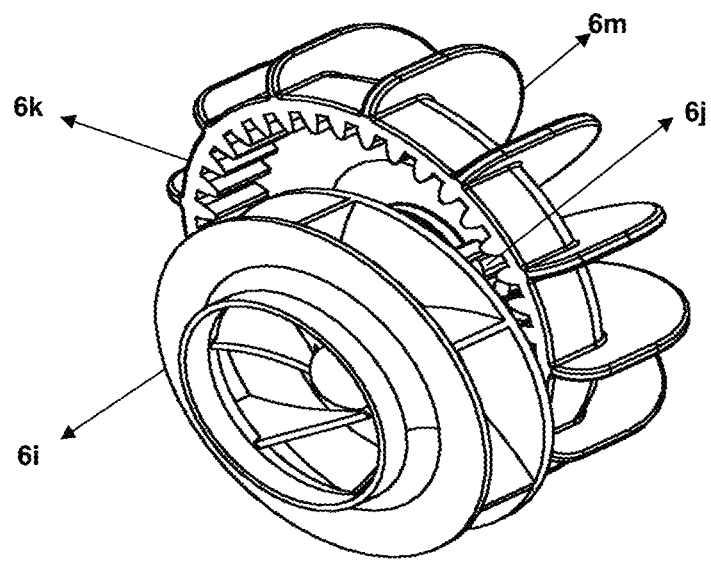
FIG. 13 is a perspective view of a section of a pumping section of the fruit and vegetable washing apparatus.
Figure 14:
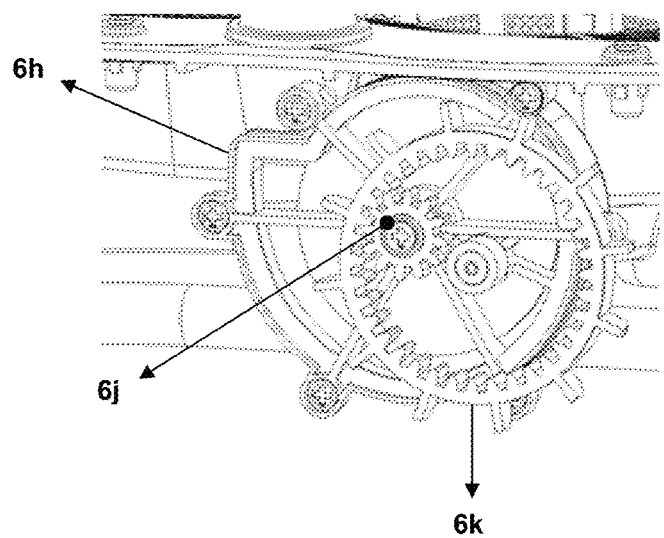
FIG. 14 is a sectional perspective view of the pumping section of the fruit and vegetable washing apparatus.

The dishwasher (M) according to the present invention, as illustrated in FIGS. 1-14, comprises a main body; at least a first basket (S) which is located in the main body and receives the dishes to be washed; and:

at least one bottom area (1) in which there are located at least one valve (1a) which is at least two-way and is connected with a water source (e.g. main supply); at least a first channel (1b) connected with the valve (1a) on one side, wherein water reaching the valve (1a) from the source is passed through the first channel (1b) to clean the dishes in the first basket (S); and at least a second channel (1c) connected with the valve (1a) on one side;

at least one washing compartment (2) having the first basket (S) therein, located in the main body and comprising at least a third channel (2a) connected with the second channel (1c) on one side and preferably extending on the bottom area (1) and parallel to the bottom area (1); at least a first water outlet (2b) which is preferably located to extend perpendicularly from the bottom area (1) towards the ceiling of the dishwasher (M) and to which the water reaching the third channel (2a) by passing through the second channel (1c) reaches, wherein one side of the first water outlet (2b) is connected with the third channel (2a) so as to have an angle other than 0 and 180 degrees in between, preferably an angle that is substantially a right angle; at least a second water outlet (2c) which is connected with the second channel (1c) on at least one side, to which the water passing through the second channel (1c) reaches, and which is preferably fixed to a surface of the bottom area (1) preferably by at least one connection member; and at least one drainage connection unit (2d), one side of which is preferably fixed to said surface of the bottom area (1) preferably by at least one connection member (the connection member is preferably the same with the connection member that fixes the second water outlet (2c) to the bottom area (1));

at least one fruit and vegetable washing compartment (F) which is located above the first basket (S) and comprises:
  at least one chamber (4) in which fruits and vegetables are washed,
  at least one carrying member (2) providing connection to the first basket (S), wherein one side of the carrying member (2) is connected with lower side of the chamber (4),
  at least a first water inlet (7) connected with the first water outlet (2b), wherein the water reaching the first water outlet (2b) by passing through second channel (1c) and third channel (2a) is transmitted through the first water inlet (7) into the carrying member (2);
  at least a second water inlet (8) which is connected with the second water outlet (2c) and transmits the water coming from the second water outlet (2c) by passing through the second channel (1c) to the chamber (4); and at least one control unit (not illustrated in the figures) which contains the information to which channel (first channel (1b) and/or the second channel (1c)) the water reaching the valve (1a) will be directed in response to at least one washing program (e.g. main washing program of the dishwasher, fruit and vegetable washing program) of the dishwasher (M) that can be selected by a user through at least one control element (e.g. a button), and controls operation of the valve (1a) such that the water reaching the valve (1a) from the source is transmitted to the second channel (1c) for washing fruits and vegetables or to the first channel (1b) for washing dishes inside the dishwasher (M), in response to the user-selected washing program In an exemplary embodiment of the invention, if a user wants to wash fruits and vegetables in said dishwasher (M), she/he places desired fruits and/or vegetables in the fruit and vegetable washing apparatus (F) and then places the fruit and vegetable washing apparatus (F) in said first basket (S). Then, when the user selects the related washing program (fruit and vegetable washing program) by the control element, the water reaching the valve (1a) is transmitted to the second channel (1c) by the control unit. The water is transmitted from the second channel (1c) into the carrying member (2) via the first water inlet (7). Similarly, the water is transmitted from the second channel (1c) into the chamber (4) via the second water inlet (8). Following completion of the washing process, dirty water inside the chamber (4) is transmitted into a dirty water discharge pump of the dishwasher (M) by means of the drainage connection unit (2d). Therefore, the dirty water can be removed from both the fruit and vegetable washing apparatus (F) and the dishwasher (M).

In a preferred embodiment of the dishwasher (M) according to the present invention, the fruit and vegetable washing apparatus (F) comprises at least one cover (3) which covers, in a sealed manner, at least one placement opening of the chamber (4) that provides placement of fruits and vegetables to be washed into the chamber (4). Therefore, a closed and sealed compartment can be provided for washing fruits and vegetables, and the washing process for fruits and vegetables can be practically prevented from being affected by the main washing program of the dishwasher.

In another alternative embodiment, the fruit and vegetable washing apparatus (F) preferably comprises:
  at least a second basket (5) in the form of a grid for enabling the water to reach fruits and vegetables, which is located in the chamber (4) and removable from the chamber (4), and in which fruits and vegetables are placed;
  at least one holding member (6b) which is located between the chamber (4) and the carrying member (2) so as to form the base of the chamber (4) and comprises at least one collection reservoir (6) in which water from the chamber (4) is collected and the collected water is discharged from at least a first opening thereof;
  at least one nozzle (6a) which is preferably rotatable around an axis substantially perpendicular to the base of the chamber (4), sprays water into the chamber (4) via holes thereon as a result of this rotational movement, so that fruits and vegetables inside the second basket (5) are cleaned, wherein the nozzle (6a) is connected to the holding member (6b) so as to be rotatable around said axis and has at least one transmission channel for spraying water from the holes thereon into the chamber (4); and
  at least one pumping section (6g) which is connected with the transmission channel (thus, with the nozzle (6a)) on at least one side and enables the water received through the second water inlet (8) into the chamber (4) to be pumped into the transmission channel of the nozzle (6a).

In this embodiment, water received into the chamber (4) is transmitted to the nozzle (6a) via the pumping section (6g), and the water reaching the transmission channel of the nozzle (6a) is sprayed out of at least one hole, which is in the form of a water jet, with the effect of the pumping pressure such that the nozzle (6a) is rotated around said axis. Therefore, water inside the chamber (4) is circulated and sprayed out of the nozzle (6a) in a way that fruit and vegetables in the basket can be effectively cleaned in a shorter time with less water consumption. In this embodiment, the pumping section (6g) is preferably located in the carrying member (2) so as to be at a lower part of the holding member (6b), and at least one part of the pumping section (6g) communicates into the chamber (4) such that water inside the chamber (4) can be filled into the pumping section (6g).

In a preferred embodiment of the invention, the pumping section (6g) comprises:
  at least one pump chamber (6h) which is connected to a fourth channel (6f) so as to be connected with the chamber (4) on a first side, and is connected on a second side with the transmission channel, wherein the water inside the chamber (4) is filled into the inner part of the pump chamber (6h) via the fourth channel (6f), and the water in the inner part of the pump chamber (6h) is transferred to the transmission channel from the second side (one side of the fourth channel (6f) communicates into the pump chamber (6h) and another side thereof preferably communicates into the collection reservoir (6c), and when the water in the chamber (4) is passed through the collection reservoir (6c) and filled into the pump chamber (6h), the pump chamber (6h) is enabled to be fluidly connected with the chamber (4));
  at least one watermill (6i) which is located at an inner part of the pump chamber (6h), performs rotational movement around a first axis that is substantially parallel to the base of the chamber (4), and transfers the water in the pump chamber (6h) to the transmission channel from the second side as a result of this rotational movement;

at least a first gear wheel (6j), one side of which is connected with the watermill (6i) from an outer side of the pump chamber (6h) and which can rotate around an axis coincident with the first axis around which the watermill (6i) rotates, and thus, rotating the watermill (6i);

at least a second gear wheel (6k) which has an inner surface having teeth corresponding to the teeth of the first gear wheel (6j), is in the form of a cylinder open on one side, has a diameter greater than the diameter of the first gear wheel (6j), and is connected to the pump chamber (6h) so as to be rotatable around a second axis parallel to the first axis (said second axis is not coincident with the first axis), wherein the first gear wheel (6j) inserts into the second gear wheel (6k) from the open side thereof and fits into the teeth provided on the inner surface thereof;

at least two fins (6m) which are located on an outer surface of the second gear wheel (6k) and enable the second gear wheel (6k) to rotate around the second axis with the effect of the water coming from the first water inlet (7) onto the fins (6m), and as a result this rotational movement, enable the second gear wheel (6k) to rotate the first gear wheel (6j) around the first axis, so that the first gear wheel (6j) rotates the watermill (6i) around the first axis; and at least a fifth channel (6n), one side of which is connected with the second side of the pump chamber (6h) and another side of which is connected with the transmission channel of the nozzle (6a) (preferably from the part where the nozzle (6a) is connected to the holding member (6b)), wherein the fifth channel (6n) enables the water in the pump chamber (6h) that is accelerated by the rotational movement of the watermill (6i) to be transmitted to the nozzle (6a) from the second side of the pump chamber (6h).

Thanks to such a structure, electrical energy is not required to rotate the nozzle (6a) for washing fruits and vegetables, and thus, fruits and vegetables can be cleaned more effectively with less energy consumption (for example, only by controlling the operation of the valve (1a)).

In another alternative embodiment, the dishwasher (M) according to the invention preferably comprises at least a first filter (6d) which is located on the collection reservoir (6c) so as to cover the collection reservoir (6c), and on which a plurality of holes are provided for filtering the dirty water from the chamber (4). The dishwasher (M) of this embodiment also comprises at least a second filter (6e) which is placed in the first opening of the collection reservoir (6c) by being passed through at least a second opening positioned at the first filter (6d) so as to be aligned with the first opening, wherein the second filter (6e) is preferably in the form of a hollow cylinder, preferably closed at the bottom so as to contain a hole, and allows the water accumulated in the collection reservoir (6c) to be filtered again before drainage process; and at least one drainage (9) which transmits the dirty water accumulated in collection reservoir (6c) into a dirty water discharge pipe of the dishwasher (M), and connects at least one drainage pipe (9a), which is connected to a bottom part of the second filter (6e), with the drainage connection unit (2d).

In an exemplary embodiment of the invention, when the user wants to wash fruits and vegetables in the dishwasher (M), she/he opens the cover (3) of the fruit and vegetable washing apparatus (F) and places the desired fruits and/or vegetables in the second basket (5). Then, she/he closes the cover (3), places the fruit and vegetable washing apparatus (F) in the first basket (S), selects the fruit and vegetable washing program by means of the control unit, and enables the valve (1a) to be brought into a position suitable for directing the water to the second channel (1c). Thus, the water reaching the valve (1a) from the source is transferred to the first water inlet (7) and the second water inlet (8) by means of the second channel (1c). The water passing through the first water inlet (7) hits the second gear wheel (6k), so that the second gear wheel (6k) is rotated and thus the first gear wheel (6j) connected to the second gear wheel (6k) is rotated to provide rotation of the watermill (6i). Rotating watermill (6i) directs the water in the pump chamber (6h), in which the watermill (6i) is provided, towards the nozzle (6a) by means of the fifth channel (6n), thereby enabling fruits and/or vegetables in the chamber (4) to be washed. Following completion of the washing process, dirty water accumulated in the collection reservoir (6c) is directed to the dirty water discharge pipe of the dishwasher by means of the drainage (9) and removed from both the fruit and vegetable washing apparatus (F) and the dishwasher (M). Therefore, the water received into the fruit and vegetable washing apparatus (F) and the dishwasher (M) do not mix with each other during washing process, and the residues (such as oil, detergent) that may remain in the dishwasher (M) do not penetrate into the washed fruit and/or vegetables.

In a preferred embodiment of the invention, the second basket (5) preferably comprises at least a first handle (5a) to facilitate holding and removing said second basket (5) from the chamber (4).

In another preferred embodiment of the invention, the fruit and vegetable washing apparatus (F) preferably comprises at least one connection area (10) which is located on at least one side of the carrying member (6) so as to facilitate its placement in the first basket (S), has a connection channel form extending on said side towards the base of the chamber (4), and is suitable for receiving a wire of the first basket (S).

In an alternative embodiment, the fruit and vegetable washing apparatus (F) preferably comprises at least a second handle (11) which is located at the chamber (4) so as to facilitate carrying. Therefore, the fruit and vegetable washing apparatus (F) can be easily placed in the first basket (S) or easily removed from the first basket (S).

In another preferred embodiment, the fruit and vegetable washing apparatus (F) of the dishwasher (M) according to the present invention comprises at least one locking mechanism (12) which enables the cover (3) to be locked to the chamber (4), and is preferably in the form of a hinge, wherein one side of the locking mechanism (12) is fixed onto the chamber (4) and another side thereof is attached to one side of the cover (3).

Thanks to the dishwasher (M) comprising a fruit and vegetable washing apparatus (F), fruits and vegetables can be washed with less water and energy consumption. Moreover, with the present invention, the water received into the fruit and vegetable washing apparatus (F) and the dishwasher (M) do not mix with each other during washing process. This prevents residues (such as oil, detergent) that may have remained in the dishwasher (M) from penetrating into the washed fruits and/or vegetables.

The invention claimed is:

1. A dishwasher (M) comprising a main body; at least a first basket (S) which is located in the main body and receives the dishes to be washed, wherein:

at least one bottom area (1) in which there are located at least one valve (1a) which is at least two-way and is connected with a water source; at least a first channel (1b) connected with the valve (1a) on one side, wherein water reaching the valve (1a) from the source is passed through the first channel (1b) to clean the dishes in the first basket (S); and at least a second channel (1c) connected with the valve (1a) on one side;

at least one washing compartment (2) having the first basket (S) therein, located in the main body and comprising at least a third channel (2a) connected with the second channel (1c) on one side; at least a first water outlet (2b) to which the water reaching the third channel (2a) by passing through the second channel (1c) reaches, wherein one side of the first water outlet (2b) is connected with the third channel (2a) so as to have an angle other than 0 and 180 degrees in between; at least a second water outlet (2c) which is connected with the second channel (1c) on at least one side and to which the water passing through the second channel (1c) reaches; and at least one drainage connection unit (2d);

at least one fruit and vegetable washing compartment (F) which is located above the first basket (S) and comprises:

at least one chamber (4) in which fruits and vegetables are washed, at least one carrying member (2) providing connection to the first basket (S), wherein one side of the carrying member (2) is connected with lower side of the chamber (4), at least a first water inlet (7) connected with the first water outlet (2b), wherein the water reaching the first water outlet (2b) by passing through second channel (1c) and third channel (2a) is transmitted through the first water inlet (7) into the carrying member (2);

at least a second water inlet (8) which is connected with the second water outlet (2c) and transmits the water coming from the second water outlet (2c) by passing through the second channel (1c) to the chamber (4); and at least one control unit which contains the information to which channel the water reaching the valve (1a) will be directed in response to at least one washing program of the dishwasher (M) that can be selected by a user through at least one control element, and controls operation of the valve (1a) such that the water reaching the valve (1a) from the source is transmitted to the second channel (1c) for washing fruits and vegetables or to the first channel (1b) for washing dishes inside the dishwasher (M), in response to the user-selected washing program.

2. A dishwasher (M) according to claim 1, wherein the fruit and vegetable washing apparatus (F) comprises at least one cover (3) which covers, in a sealed manner, at least one placement opening of the chamber (4) that provides placement of fruits and vegetables to be washed into the chamber (4).

3. A dishwasher (M) according to claim 1, wherein the fruit and vegetable washing apparatus (F) comprises:

at least a second basket (5) in the form of a grid for enabling the water to reach fruits and vegetables, which is located in the chamber (4) and removable from the chamber (4), and in which fruits and vegetables are placed;

at least one holding member (6b) which is located between the chamber (4) and the carrying member (2) so as to form the base of the chamber (4) and comprises at least one collection reservoir (6) in which water from the chamber (4) is collected and the collected water is discharged from at least a first opening thereof;

at least one nozzle (6a) which is rotatable around an axis, sprays water into the chamber (4) via holes thereon as a result of this rotational movement, so that fruits and vegetables inside the second basket (5) are cleaned, wherein the nozzle (6a) is connected to the holding member (6b) so as to be rotatable around said axis and has at least one transmission channel for spraying water from the holes thereon into the chamber (4); and at least one pumping section (6g) which is connected with the transmission channel on at least one side and enables the water received through the second water inlet (8) into the chamber (4) to be pumped into the transmission channel of the nozzle (6a).

4. A dishwasher (M) according to claim 3, wherein the pumping section (6g) is located in the carrying member (2) so as to be at a lower part of the holding member (6b), and at least one part of the pumping section (6g) communicates into the chamber (4) such that water inside the chamber (4) can be filled into the pumping section (6g).

5. A dishwasher (M) according to claim 3, wherein the pumping section (6g) comprises:

at least one pump chamber (6h) which is connected to a fourth channel (6f) so as to be connected with the chamber (4) on a first side, and is connected on a second side with the transmission channel, wherein the water inside the chamber (4) is filled into the inner part of the pump chamber (6h) via the fourth channel (6f), and the water in the inner part of the pump chamber (6h) is transferred to the transmission channel from the second side;

at least one watermill (6i) which is located at an inner part of the pump chamber (6h), performs rotational movement around a first axis that is substantially parallel to the base of the chamber (4), and transfers the water in the pump chamber (6h) to the transmission channel from the second side as a result of this rotational movement;

at least a first gear wheel (6j), one side of which is connected with the watermill (6i) from an outer side of the pump chamber (6h) and which can rotate around an axis coincident with the first axis around which the watermill (6i) rotates, and thus, rotating the watermill (6i);

at least a second gear wheel (6k) which has an inner surface having teeth corresponding to the teeth of the first gear wheel (6j), is in the form of a cylinder open on one side, has a diameter greater than the diameter of the first gear wheel (6j), and is connected to the pump chamber (6h) so as to be rotatable around a second axis parallel to the first axis, wherein the first gear wheel (6j) inserts into the second gear wheel (6k) from the open side thereof and fits into the teeth provided on the inner surface thereof;

at least two fins (6m) which are located on an outer surface of the second gear wheel (6k) and enable the second gear wheel (6k) to rotate around the second axis with the effect of the water coming from the first water inlet (7) onto the fins (6m), and as a result this rotational movement, enable the second gear wheel (6k) to rotate the first gear wheel (6j) around the first axis, so that the first gear wheel (6j) rotates the watermill (6i) around the first axis; and at least a fifth channel (6n), one side of which is connected with the second side of the pump chamber (6h) and another side of which is connected with the transmission channel of the nozzle (6a), wherein the fifth channel (6n) enables the water in the pump chamber (6h) that is accelerated by the rotational movement of the watermill (6i) to be transmitted to the nozzle (6a) from the second side of the pump chamber (6h).

6. A dishwasher (M) according to claim 3, wherein at least a first filter (6d) which is located on the collection reservoir (6c) so as to cover the collection reservoir (6c), and on which a plurality of holes are provided for filtering the dirty water from the chamber (4).

7. A dishwasher (M) according to claim 6, wherein at least a second filter (6e) which is placed in the first opening of the collection reservoir (6c) by being passed through at least a second opening positioned at the first filter (6d) so as to be aligned with the first opening, wherein the second filter (6e) allows the water accumulated in the collection reservoir (6c) to be filtered again before drainage process; and at least one drainage (9) which transmits the dirty water accumulated in collection reservoir (6c) into a dirty water discharge pipe of the dishwasher (M), and connects at least one drainage pipe (9a), which is connected to a bottom part of the second filter (6e), with the drainage connection unit (2d).

8. A dishwasher (M) according to claim 7, wherein the second filter (6e) is in the form of a hollow cylinder.

9. A dishwasher (M) according to claim 7, wherein the second filter (6e) is closed at the bottom so as to contain a hole.

10. A dishwasher (M) according to claim 3, wherein the second basket (5) comprises at least a first handle (5a) to facilitate holding and removing said second basket (5) from the chamber (4).

11. A dishwasher (M) according to claim 1, wherein the fruit and vegetable washing apparatus (F) comprises at least one connection area (10) which is located on at least one side of the carrying member (6) so as to facilitate its placement in the first basket (S), has a connection channel form extending on said side towards the base of the chamber (4), and is suitable for receiving a wire of the first basket (S).

12. A dishwasher (M) according to claim 1, wherein the fruit and vegetable washing apparatus (F) comprises at least a second handle (11) which is located at the chamber (4) so as to facilitate carrying.

13. A dishwasher (M) according to claim 1, wherein the fruit and vegetable washing apparatus (F) comprises at least one locking mechanism (12) which enables the cover (3) to be locked to the chamber (4), wherein one side of the locking mechanism (12) is fixed onto the chamber (4) and another side thereof is attached to one side of the cover (3).

14. A dishwasher (M) according to claim 13, wherein the locking mechanism (12) is in the form of a hinge.

\* \* \* \* \*